United States Patent [19]

Lauve

[11] 4,257,681
[45] Mar. 24, 1981

[54] AUTOMOTIVE REAR VIEW MIRROR

[75] Inventor: Henry d.S. Lauve, Troy, Mich.

[73] Assignee: Electric Fuel Propulsion Corp., Troy, Mich.

[21] Appl. No.: 87,624

[22] Filed: Oct. 23, 1979

[51] Int. Cl.³ .................................................. G02B 7/18
[52] U.S. Cl. ................................. 350/307; 74/501 M; 248/481
[58] Field of Search ............... 350/307, 293, 303, 304; 248/467, 481, 482, 483, 475 R, 476; 74/501 M

[56] References Cited

FOREIGN PATENT DOCUMENTS

| 2037555 | 2/1972 | Fed. Rep. of Germany | 350/307 |
| 2302215 | 9/1976 | France | 248/481 |
| 2316842 | 1/1977 | France | 248/476 |
| 1431778 | 4/1976 | United Kingdom | 248/481 |

Primary Examiner—Jon W. Henry

[57] ABSTRACT

A reflecting mirror is pivotally mounted in an aerodynamically-shaped cowl which has a standardless base flange with two laterally outwardly protruding edges. One of these edges is forced between the window grommet and the door molding and, as the device is slid forward, the other base flange protruding edge is forced between the window grommet and the pillar molding. The flange edges may be given a coating of adhesive as a preliminary step in order to secure the mirror in place. A remote control version is disclosed.

11 Claims, 6 Drawing Figures

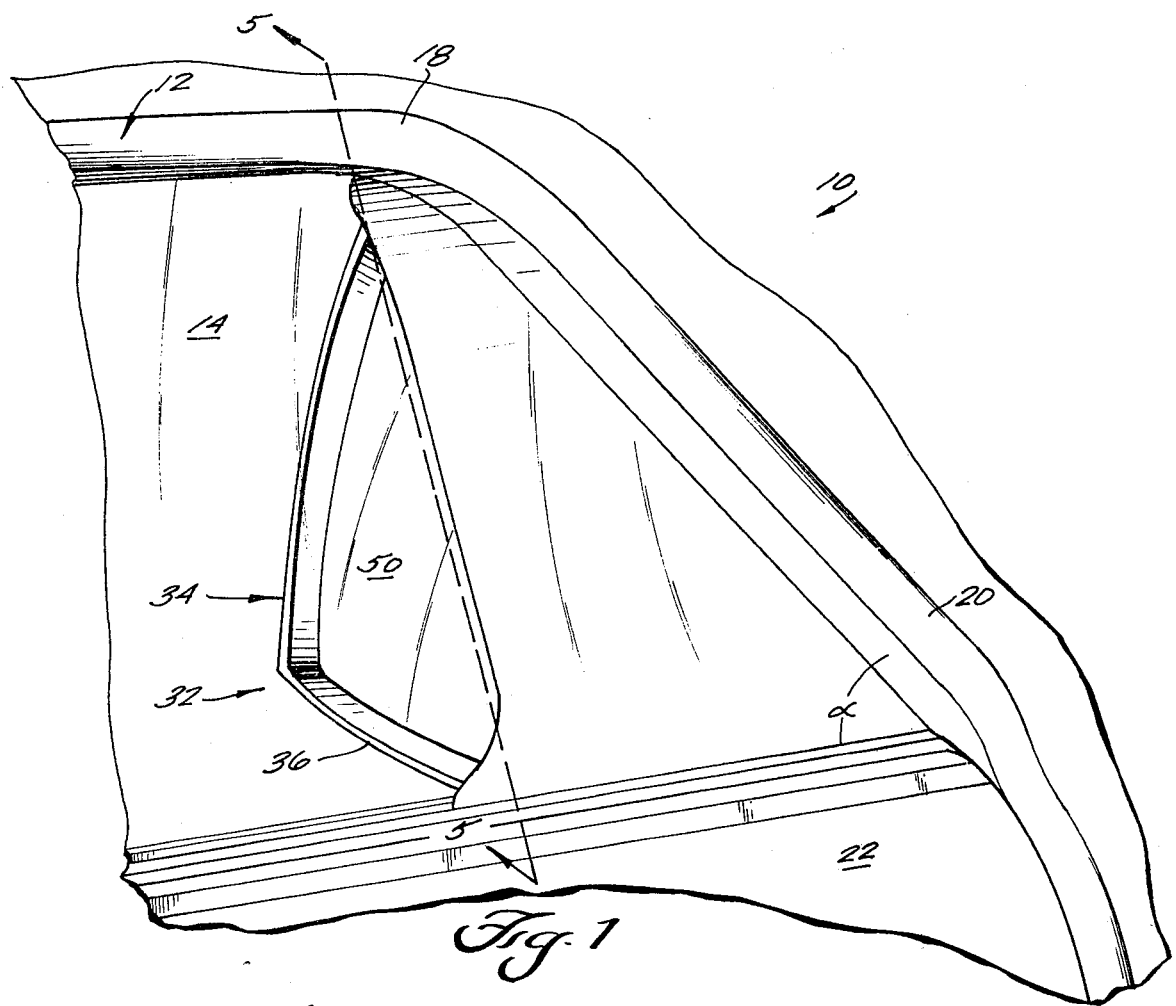
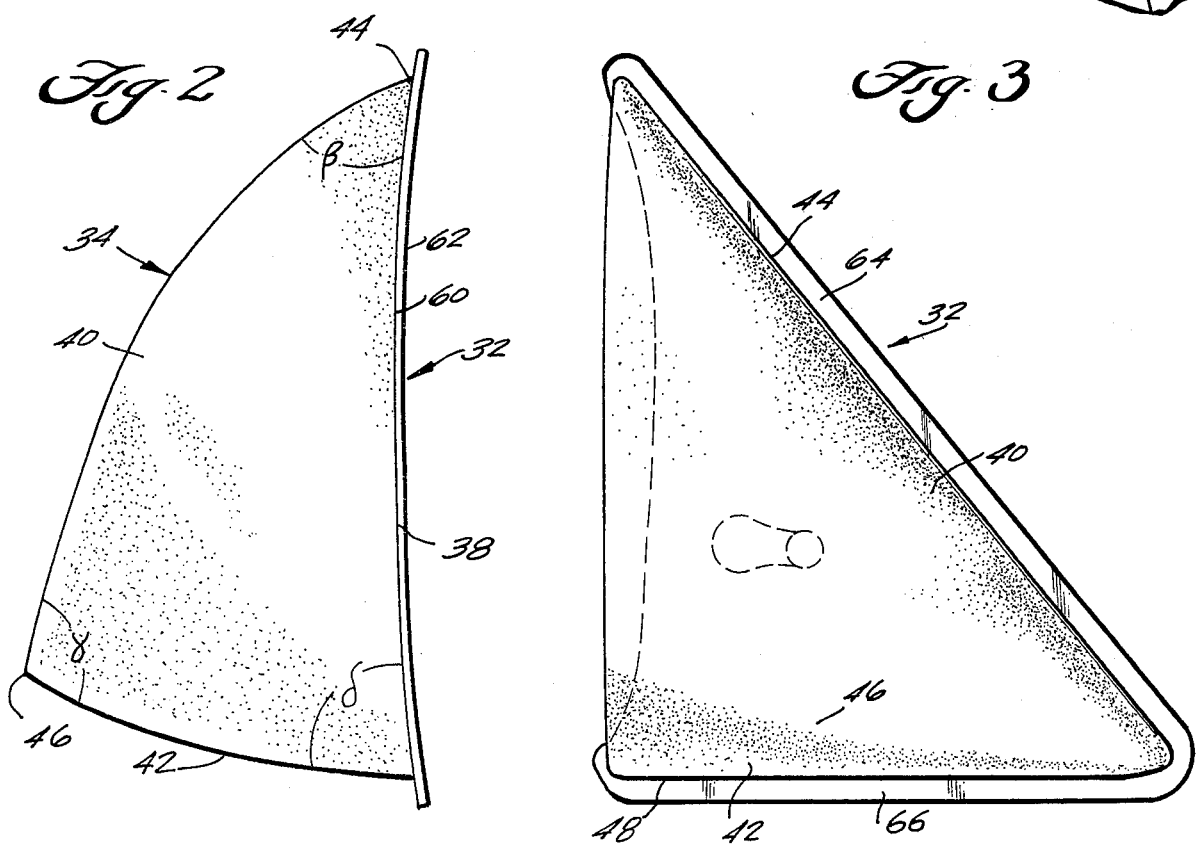

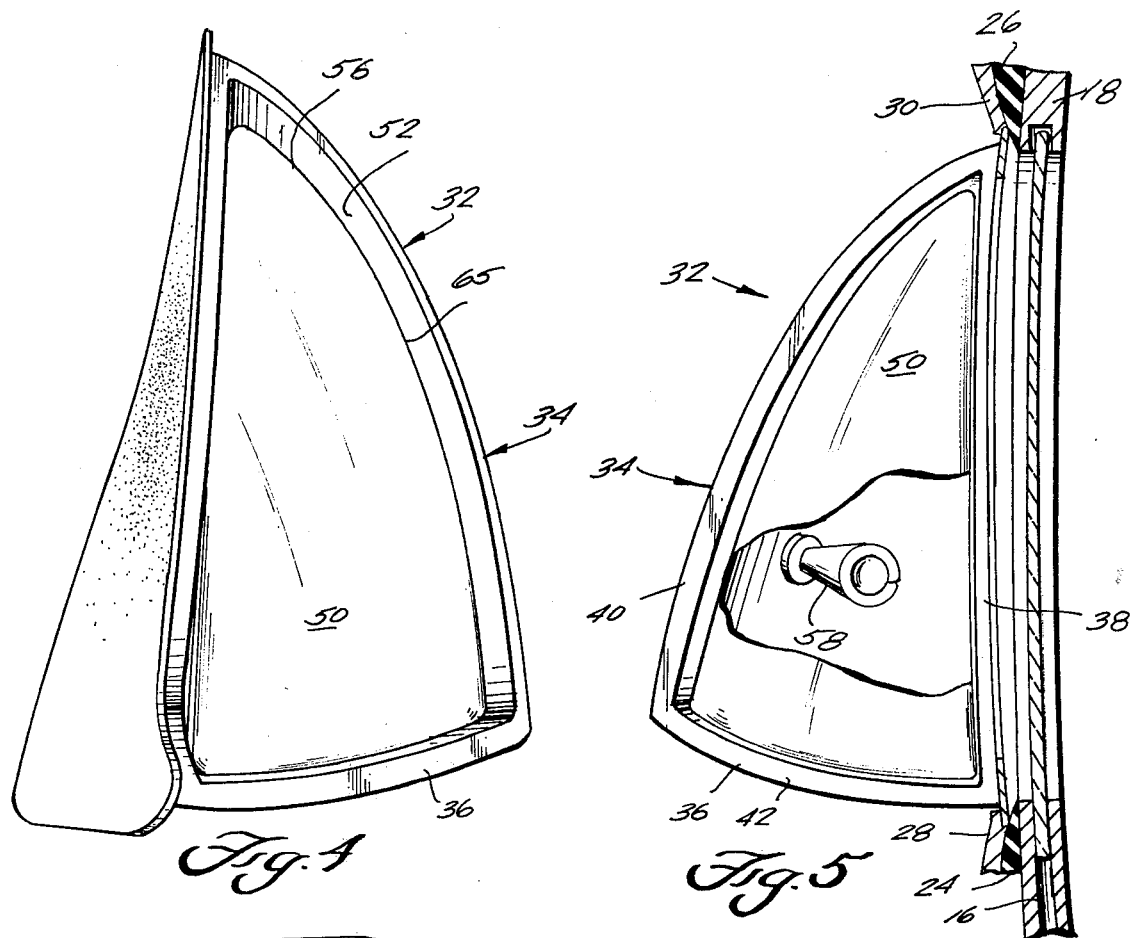
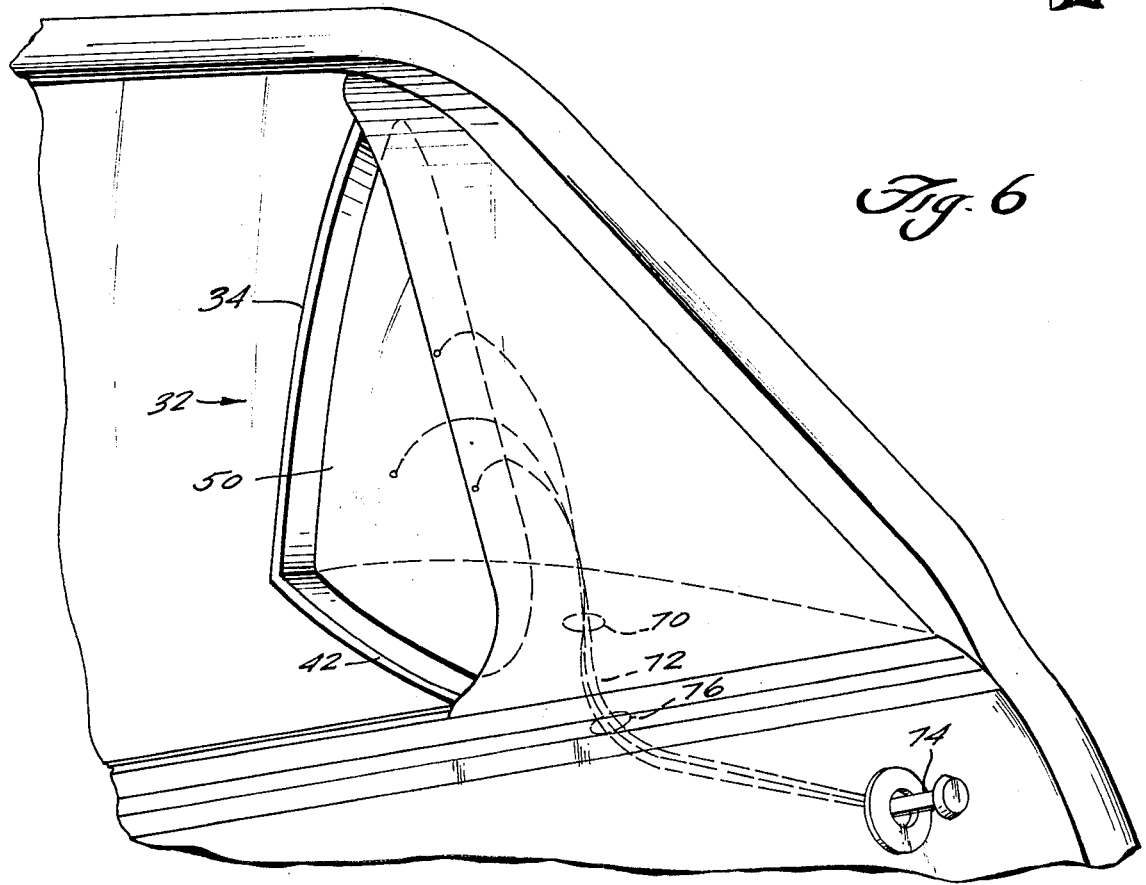

AUTOMOTIVE REAR VIEW MIRROR

BACKGROUND OF THE INVENTION

Usually, automotive outside rear view mirrors comprise a standard articulated to a mirror, with the base of the standard being bolted or screwed to the automotive body on or adjacent the driver's or driver's seat passenger's door. Sometimes such mirrors are provided with cable means which connect between the mirror and a joy stick mounted on the interior of the vehicle door to provide for mirror adjustment from within the vehicle.

Prior art automotive outside rear view mirrors are relatively difficult to mount, special tools often being needed, and their aerodynamic characteristics leave much to be desired.

SUMMARY OF THE INVENTION

A reflecting mirror is pivotally mounted in an aerodynamically-shaped cowl which has a standardless base flange with two laterally outwardly protruding edges. One of these edges is forced between the window grommet and the door molding and, as the device is slid forward, the other base flange protruding edge is forced between the window grommet and the pillar molding. The flange edges may be given a coating of adhesive as a preliminary step in order to secure the mirror in place. A remote control version is disclosed.

The principles of the invention will be further discussed with reference to the drawings wherein preferred embodiments are shown. The specifics illustrated in the drawings are intended to exemplify, rather than limit, aspects of the invention as defined in the claims.

BRIEF DESCRIPTION OF THE DRAWING

FIG. 1 is a fragmentary perspective view of an automobile showing the automotive rear view mirror of the invention mounted in place.

FIG. 2 is a rear elevational view of the automotive rear view mirror;

FIG. 3 is an outer side elevational view thereof; and

FIG. 4 is an inner side perspective view thereof.

FIG. 5 is a cross-sectional view on line 5—5 of FIG. 1.

FIG. 6 is a fragmentary perspective view corresponding to FIG. 1, but showing a modified version where the mirror is adapted for remote adjustment.

(The convention used for description herein is that the "rear" of the mirror is the aspect one has of it while looking at the mounted mirror while seated in the vehicle.)

DETAILED DESCRIPTION

An automotive vehicle is generally indicated at 10. The particular vehicle illustrated is of the type having a driver's or passenger's door 12 having a window 14 which may be lowered and raised by conventional means (not shown), for opening and closing the window. The door 12 includes a conventional upwardly open slot 16 into which the window 14 recedes upon being lowered and up through which the window projects. The door 12 further includes a window frame 18 which supports, guides and seals with the window front edge, upper edge and rear edge. At the front edge of the window, the front pillar 20 of the frame 18 makes a typically acute angle $\alpha$ with the slotted upper edge of the main body 22 of the door 12.

Typically, the outer side of the slot 16 is provided with a strip of rubber and/or pile fabric grommet 24 for forming a weather seal with the exterior surface of the window 14 where the window protrudes therethrough and the frame 18 is provided with a similar strip of grommet 26 for forming a weather seal with the exterior surface of the window at the front, top and rear margins of the window. Also typically, there is a bead of bright metal or metalized plastic molding 28 installed between the door body and the grommet 24 and an identical or similar bead of molding 30 installed between the window frame 18 and the grommet 26.

The automotive outside rear view mirror 32 of the invention is illustrated in an unmounted condition in FIGS. 2-4. In general, its overall appearance is that of half of a longitudinally bisected bullet, oriented point-forwards with its "nose" nestled into the apex $\alpha$ and with its "bisection plane" presented flatwise in juxtaposition with or against the outer surface of the car window.

Although a right side (e.g. American passenger's side) rear view mirror is illustrated, it should be apparent that a mirror-image structure could be identically provided on the left side of the vehicle.

The rear view mirror 32 includes a cowl, shroud or housing 34 generally comprising an irregular tetrahedron which is open to the rear so that it has a generally triangular rim 36 at its mouth. The cowl 34 may be made of conventional material, e.g. of molded fiber reinforced plastic or cast zinc alloy. The inner wall 38 of the cowl is generally flat and generally vertical; the outer wall 40 arches outwardly and downwardly, being somewhat convex externally; and the lower wall 42 of the cowl is generally horizontal but arched downwardly so as to also be somewhat convex externally. The inner wall 38 and outer wall 40 join along an obliquely-oriented (down in front) externally longitudinally generally straight corner 44. The outer wall 40 and the lower wall 42 join along a less oblique (down in front) generally horizontal, longitudinally externally somewhat convex corner 46. The lower wall 42 and the inner wall 38 join along a generally horizontal, longitudinally generally straight corner 48. At least adjacent the rim 36, the internal angle $\beta$ at the corner 44 in the preferred embodiment is substantially acute, the internal angle $\gamma$ at the corner 46 is somewhat obtuse and the internal angle $\delta$ at the corner 48 is approximately a right angle.

The corner 46 is somewhat rounded externally.

A generally triangular reflecting mirror 50 of metalized glass, metalized plastic or the like is disposed in the open mouth 52 of the cowl 34 so as to be longitudinally recessed somewhat relative to the rim 36. The perimetrical edge 65 of the reflecting mirror 50 is similar in figure to the shape of the mouth 52, although it is slightly smaller. Accordingly, there is a slight gap 56 provided perimetrically between the reflecting mirror 50 and the mouth of the cowl, but in general the reflecting mirror 50 closes the open side of the tetrahedral cowl 34.

Internally of the cowl, there is an otherwise conventional universal or at least pivotal joint 58 provided between the cowl and the interior side of the reflecting mirror. This permits the usual, expected adjustability of the reflecting mirror for suiting drivers of differing height and driving attitude relative to the vehicle.

The mirror 32 is remarkable for not having a mounting standard. Rather, the cowl 34 is mounted directly to the vehicle, so that it appears as a streamlined "blip" bulging directly from the side of the vehicle.

Mounting is facilitated as follows. Against the exterior face 60 of the inner wall 38 of the cowl 34 there is mounted a generally triangular plate 62 which has generally the same figure as the inner wall 38, except for being extended along its front and bottom edges to provide respective flanges 64, 66. The plate 62 may be adhered facewise to the wall 38 using a conventional adhesive, or mechanically secured therewith or it may be integrally formed with the wall 38.

Referring to FIGS. 1 and 5, it may be understood that the mirror 32 is easily installed on the automobile 10, without any need for drilling holes and without any need for special tools.

Installation proceeds as follows. Some conventional adhesive may be applied to flanges 64 and 66. Then at a point slightly behind the final disposition of the mirror 32, the flange 66 is inserted between the door body molding 28 and the window grommet strip 24. Next the mirror 32 is slid forwards as far as it will go, so that the adhesive-bearing flange 64 becomes buried between the window frame pillar molding 30 and the window grommet strip 26. This simple procedure, which should take less than two minutes to accomplish leaves the mirror 32 completely installed as shown in FIGS. 1 and 5.

The mounted device 32 does not interfere at all with raising and lowering of the window and with opening and closing the door.

A somewhat more complex, optional installation is shown in FIG. 6 for providing for remote adjustment of the reflecting mirror from within the vehicle. The only difference is that the lower wall 42 of the cowl is provided in advance with an opening 70. A set 72 of conventional remote control cables is conventionally provided on the vehicle 10 and is connected at one end to a joy stick 74 conventionally mounted within the vehicle. Internally of the cowl, the remote control cables 72 are conventionally anchored to the back of the reflecting mirror. Accordingly, the joy stick 74 may be tipped various ways to correspondingly tilt the reflecting mirror on its universal or pivotal joint within the cowl 34. Typically, the joy stick 74 and cables 72 are conventionally mounted on the automotible first and the cables 72 protrude out through a hole 76 located directly under where the mirror 32 is to be mounted. The cowl 34 minus its reflecting mirror 50 is then installed using the same procedure as described above for the FIG. 1 version. Next the set of cables is penetrated into the cowl through the opening 70 and are conventionally attached to the back side of the still unmounted reflecting mirror 50. Finally, the reflecting mirror is inserted into the cowl mouth and engaged on its universal or pivotal joint therein. Only a small amount of the set of cables remains exposed and may be suitably fared or covered if desired. Although it is thus possible to provide a remotely adjustable version of the mirror of the invention, the simpler version shown in FIGS. 1–5 is preferred.

Thus the invention provides an easily installed, aerodynamic rear view mirror. The lack of wind resistance associated with use thereof contributes considerably to the energy saving qualities of an otherwise streamlined automotive vehicle. This can be especially important where the vehicle is primarily electrically powered and depends on the making of a number of individually modest contributions to efficiency in order to provide an adequate range of the vehicle.

It should now be apparent that the automotive rear view mirror as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. An outside rear view mirror for a vehicle having a side window relative to a principal direction of motion, which side window is framed at a front corner by two framing elements which meet at an angle, said mirror comprising:

a cowl including forwardly, upwardly, outwardly and downwardly presented outer wall means collectively of streamlined configuration relative to said principal direction of motion;

said cowl further including inner side wall means having two mounting flange means provided thereon, one located to be secured to one of said window framing elements and the other located to be secured to the other of said window framing elements with the cowl laterally juxtaposed with said side window at said front corner;

a reflecting mirror body mounted on said cowl behind said wall means collectively of streamlined configuration, and including a generally rearwardly presented reflecting surface;

said outer wall means of said cowl converging forwardly and downwardly with said two mounting flange means extending from said inner side wall means at an acute angle relative to one another, thus configuring said outside rear view mirror to be used at the lower front corner of said side window; and said cowl wall means comprising a three-faced generally tetrahedral body having a rearwardly open side for a mouth, said reflecting mirror body being disposed in said mouth.

2. The outside rear view mirror of claim 1, wherein: said reflecting mirror body is mounted within the housing by pivotal joint means located within the housing.

3. The outside rear view mirror of claim 1, wherein: said inner side wall means of said cowl includes one of said faces of said tetrahedral body, and said mounting flange means include a generally triangular plate mounted facewise on said one face of said tetrahedral body, and having two marginal strips along two respective edges thereof respectively constituting two flanges for securement respectively to said two framing elements of said side window.

4. The outside rear view mirror of claim 1, wherein: said two mounting flange means project laterally outwardly generally in the same plane at angularly opposite margins of said cowl outer wall means relative to said corner.

5. The outside rear view mirror of claim 1, further including:

remote control cable means projecting into the cowl through said outer wall means and being connected therewithin to said reflecting mirror body.

6. A vehicle-mounted outside rear view mirror, comprising:

a side window relative to a principal direction of motion, which side window is framed at a front corner by two framing elements which meet at an angle, said mirror comprising:

a cowl including forwardly, upwardly, outwardly and downwardly presented outer wall means collectively of streamlined configuration relative to said principal direction of motion;

said cowl further including inner side wall means having two mounting flange means provided thereon, one secured to one of said window framing elements and the other secured to the other of said window framing elements with the cowl laterally juxtaposed with said side window at said front corner;

a reflecting mirror body mounted on said cowl behind said wall means collectively of streamlined configuration, and including a generally rearwardly presented reflecting surface; and each of said window framing elements including a strip of resilient material arranged for forming a weather seal with the exterior of said side window, and a bead element outwardly bordering said strip of resilient material;

each mounting flange means including a flange element wedged between a respective said strip of resilient material and a respective said bead element of a respective said side window framing element.

7. The vehicle-mounted outside rear view mirror of claim 6, further including:

an application of adhesive on each said flange element adhering that flange element to the respective said side window framing element.

8. The vehicle-mounted outside rear view mirror of claim 6, wherein:

said outer wall means of said cowl converge forwardly and downwardly with said two mounting flange means extending from said inner side wall means at an acute angle relative to one another, thus configuring said outside rear view mirror to be used at the lower front corner of said side window.

9. The vehicle-mounted outside rear view mirror of claim 8, wherein:

said two mounting flange means project laterally outwardly generally in the same plane at angularly opposite margins of said cowl outer wall means relative to said corner.

10. The vehicle-mounted outside rear view mirror of claim 9, wherein:

said cowl wall means comprise a three-faced generally tetrahedral body having a rearwardly open side for a mouth, said reflecting mirror body being disposed in said mouth.

11. The vehicle-mounted outside rear view mirror of claim 8, wherein:

said cowl wall means comprise a three-faced generally tetrahedral body having a rearwardly open side for a mouth, said reflecting mirror body being disposed in said mouth;

said inner side wall means of said cowl including one of said faces of said tetrahedral body, and said mounting flange means include a generally triangular plate mounted facewise on said one face of said tetrahedral body, and having two marginal strips along two respective edges thereof respectively constituting two flanges for securement respectively to said two framing elements of said side window.

* * * * *